United States Patent [19]

Welch

[11] Patent Number: 4,807,827
[45] Date of Patent: Feb. 28, 1989

[54] FRICTION DRIVE FOR LINE GUIDE ON BAIT CAST REEL
[75] Inventor: Robert F. Welch, Bixby, Okla.
[73] Assignee: Zebco Corporation, Tulsa, Okla.
[21] Appl. No.: 78,293
[22] Filed: Jul. 27, 1987
[51] Int. Cl.⁴ .................. A01K 89/04; F16H 13/02; F16H 55/34
[52] U.S. Cl. .................. 242/84.42; 74/206; 74/214; 242/217; 474/30
[58] Field of Search .................. 242/84.4, 84.41, 84.42, 242/158.3, 217, 218, 219, 220, 221; 74/206, 214, 215, 216; 474/30, 34, 89, 160

[56] References Cited
U.S. PATENT DOCUMENTS

| 718,416 | 1/1903 | Bishop | 242/84.42 |
|---|---|---|---|
| 1,496,120 | 6/1924 | Hilger | 74/206 |
| 2,281,481 | 4/1942 | Clickner | 242/84.42 |
| 2,338,126 | 1/1944 | Maynes | 242/84.42 |
| 2,489,792 | 11/1949 | Lindstrom | 74/206 |
| 2,523,134 | 9/1950 | Maynes | 242/84.42 |
| 2,747,415 | 5/1956 | Bennett | 74/206 X |
| 2,774,247 | 12/1956 | Knost | 74/206 |
| 2,848,884 | 8/1958 | Maude | 464/30 |
| 2,979,281 | 4/1961 | Shafer | 242/217 X |
| 3,030,046 | 4/1962 | Markoff-Moghadam | 242/84.53 |
| 3,406,583 | 10/1968 | Baier | 464/30 X |
| 3,447,760 | 6/1969 | Sarah | 242/84.42 |
| 4,231,268 | 11/1980 | Osanai | 74/206 X |
| 4,232,842 | 11/1980 | Noda | 242/217 X |
| 4,578,047 | 3/1986 | Pissot | 464/30 |

Primary Examiner—Joseph J. Hail, III
Attorney, Agent, or Firm—Wood, Dalton, Phillips, Mason & Rowe

[57] ABSTRACT

An improvement in a bait cast reel of the type having a line-carrying spool, a rotatable crank handle with an associated crank shaft for imparting rotation to the spool to wind line thereon, a line guide, and a worm bear operable in response to rotation of the crank shaft for causing reciprocative movement of the line guide across the spool as the spool is rotated to thereby evenly distribute line on the spool. The improvement is a drive pulley element that follows rotation of the crank shaft and frictionally engages a shaft carrying the worm gear to impart rotation thereto. Slippage can occur between the drive element and the worm gear shaft when a predetermined resistance to rotation of the worm gear shaft is encountered, i.e. when a user's finger jams the line guide.

3 Claims, 2 Drawing Sheets

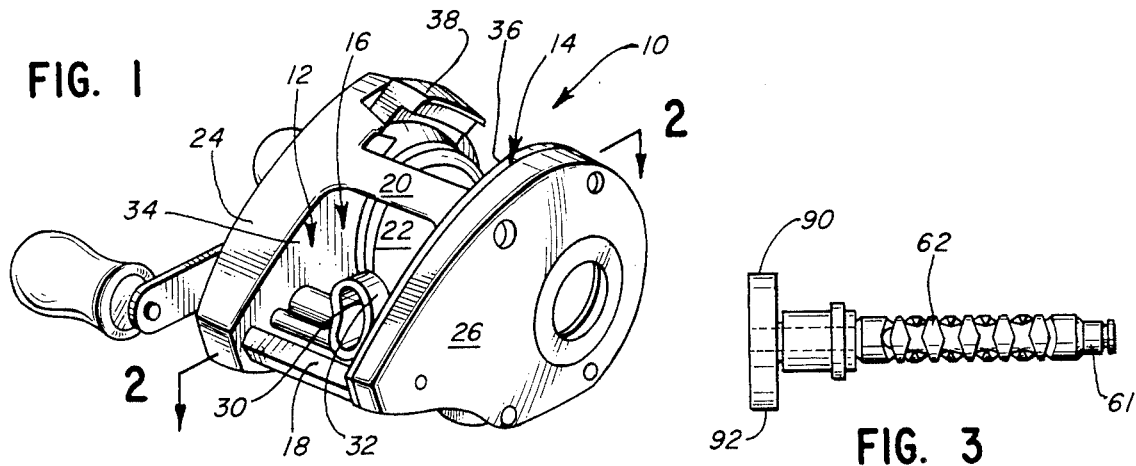
FIG. 1
FIG. 3
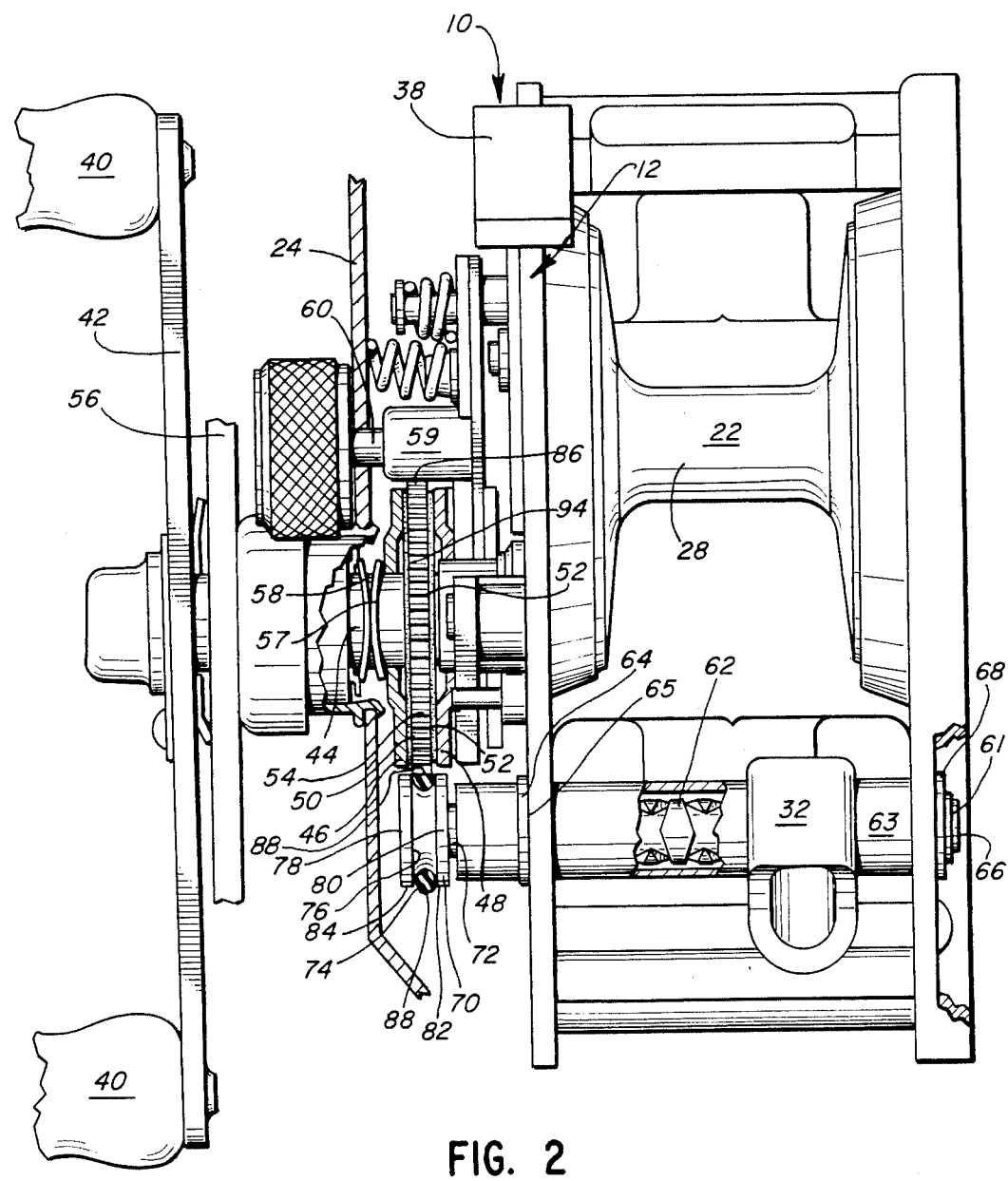
FIG. 2

4,807,827

FRICTION DRIVE FOR LINE GUIDE ON BAIT CAST REEL

BACKGROUND OF THE INVENTION

1. Field of the Invention

This invention relates to bait cast reels and, more particularly, to a friction drive for a reciprocating line guide on the reel.

2. Background Art

In a conventional bait cast reel, a line-carrying spool is rotated by a crank handle to retrieve line. To assure that the line is evenly distributed across the spool, a line guide, through which the line is passed, reciprocates between side plates bounding a line storage space concurrently with the spool rotation. In one common construction, a crank gear, associated with a shaft driven by the crank handle, drives both a shaft for rotating the spool and a shaft with a worm gear for imparting reciprocating movement to the line guide. The crank gear is in mesh with gears on each of the driven shafts.

While the foregoing arrangement positively drives the line guide, there is one very serious drawback with such a construction. Frequently, a user will get a finger pinched between the moving line guide and the side plates bounding the line storage space.

To avoid this problem, some manufacturers have incorporated a hood over the path of the line guide. While this structure has effectively prevented inadvertent passage of a user's finger between the line guide and one of the side plates, it has created additional production problems. The hood represents an additional cost which must be passed on to the consumer and complicates manufacture of the reel. Further, the hood is an obtrusive addition to the reel that makes it difficult to thread line through the line guide.

SUMMARY OF THE INVENTION

The present invention is specifically directed to overcoming the above enumerated problems in a novel and simple manner.

The invention contemplates an improvement in a bait cast reel of the type having a line-carrying spool, a rotatable crank handle with an associated crank shaft for imparting rotation to the spool to wind line thereon, a line guide, and a worm gear operable in response to rotation of the crank shaft for causing reciprocative movement of the line guide across the spool as the spool is rotated to thereby evenly distribute line on the spool.

The improvement is a drive pulley element that follows rotation of the crank shaft and frictionally engages a shaft carrying the worm gear to impart rotation from the crank shaft thereto. Slippage can occur between the pulley and the worm gear shaft when a predetermined resistance to rotation of the worm gear shaft is encountered, i.e. when a user's finger jams the line guide. Thus, when a user inadvertently sticks a finger between the line guide and the reel frame, the crank handle can be operated without increasing the force pinching the user's finger. Once the finger or other obstruction is removed, normal operation of the reel can immediately resume.

In one embodiment there is a disk-shaped pulley wheel with an annular surface on the worm drive shaft for engaging an annular drive surface on the driving element on the crank shaft. The annular surface may have teeth for meshing with the crank gear or may be friction driven. The wheel may be molded, pressed or keyed onto the end of the worm drive shaft. The wheel is made preferably from a high friction, resilient material such as a hard rubber or plastic.

Alternatively, a pulley can be provided on the worm drive element shaft to accept a conventional rubber O-ring. The pulley has an annular undercut slot to maintain the O-ring in a predetermined location. The crank gear slips relative to the O-ring and/or the O-ring slips relative to the pulley with a predetermined resistance to rotation of the worm drive element shaft. This latter construction has the advantage that the relatively inexpensive O-ring can be readily replaced when it becomes worn or otherwise fails.

BRIEF DESCRIPTION OF THE DRAWINGS

FIG. 1 is a perspective view of a bait cast reel incorporating a friction drive for a line guide according to the present invention;

FIG. 2 is an enlarged, sectional view of the reel taken along line 2—2 of FIG. 1 with one type of drive pulley for a rotary worm gear shaft on the line guide according to the invention;

FIG. 3 is an elevation view of a worm gear with a modified pulley according to the invention;

DESCRIPTION OF THE PREFERRED EMBODIMENTS

Figure 4:
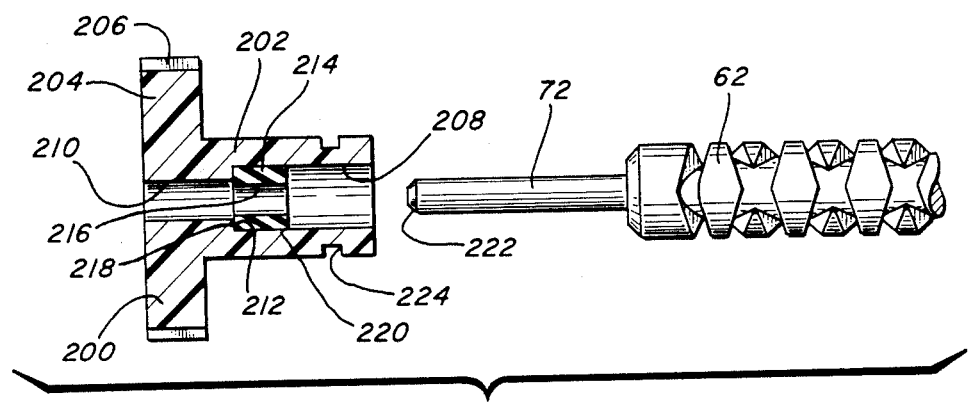
FIG. 4 is a section view of another modified form of pulley according to the invention and shown separated from an end of the worm gear.

In FIGS. 1 and 2, a bait cast reel with a first form of the invention is depicted. The basic reel, at 10, has a frame with laterally spaced side plates 12, 14 cooperatively bounding a spool storage space 16. The spacing between the plates 12, 14 is maintained by a plurality of laterally extending reinforcing posts 18, 20. A line-carrying spool 22 is journalled for rotation between the plates 12, 14. The plates 12, 14 and associated covers 24, 26 respectively, enclose spaces that are occupied by the reel operating mechanism. A description of the structural details of the reel depicted is not necessary to understand the present invention. The reel shown is mechanically the same as commercially available reels manufactured by Zebco Company and sold in their QUANTUM line.

In operation, a supply of line, not shown, is wound on the hub 28 of the spool 22. The free end of the line is directed through an opening 30 in a line guide 32 that is mounted for reciprocating movement between the facing surfaces 34, 36 of the plates 12, 14 respectively, by structure described more fully below.

To pay out line, a thumb button 38 is depressed so that the spool 22 is released to spin freely. Once a desired amount of line is withdrawn, the user grabs either of two knobs 40 on a crank handle 42 to initiate rotation thereof and an associated, laterally extending crank shaft 44. The crank shaft 44 has associated drag washers 46, 48 which are controllably pressed against oppositely facing surfaces 50,52 on a crank gear 54. The captive pressure of the drag washers 46, 48 is selectively controlled by a drag knob 56. Increasing the drag through the knob 56 urges wave washers 57, 58 towards the right in FIG. 2 and biasably against the drag washer 46. Increasing the pressure on the crank gear 54 increases the torque that can be applied through the crank handle 42 to the crank gear 54 before slippage occurs therebetween.

The crank gear 54 is in mesh with a pinion gear 59 keyed on a shaft 60 extending through and keyed to the spool 22. The crank gear 54 at the same time drives a shaft 61 having an associated, conventional, two direction worm gear 62. The shaft 61 extends through a sleeve 63 between the side plates 12, 14. The shaft 61 has an integral, annular enlargement 64 with a wall 65 which abuts the side plate 12 with the shaft 61 directed from left to right in FIG. 2 into operative position. The distal end 66 of the shaft 61 protrudes through the plate 14 and is suitably secured against lateral shifting as by a clip 68. The sleeve 63 has a longitudinal slot (not shown) through which engagement can be established between the worm gear 62 and the line guide 32.

As the crank handle 42 is operated to retrieve line, the line guide 32 travels back and forth between the plates 12, 14 and its path brings it into close proximity to the facing surfaces 34, 36 on the walls 12, 14 respectively. It is when the line guide 32 approaches the extremes of its travel that the potential for capturing a user's finger arises.

Rotation of the shaft 61 is imparted through the crank gear 54. The invention contemplates that crank gear 54 can rotate relative to the shaft 61 under a predetermined force resisting rotation of shaft 61 so that in the event a user gets his finger interposed between the line guide 32 and one of the side plates 12, 14, the finger will not be forcibly trapped or injured.

To accomplish this connection, an hourglass-shaped pulley fitting 70 is secured on the end 72 of the shaft 61 protruding laterally outwardly from plate 12. An O-ring 74 is disposed around the fitting 70 in an annular recessed seat 76 defined between adjacent flanges 78, 80 on the fitting 70. The relationship between the seat 76 and O-ring 74 is chosen so that the O-ring projects radially outwardly beyond the outermost edges 82, 84 of the flanges 78, 80. As seen in FIG. 2, the outer, toothed drive surface 86 of the crank gear 54 engages and compresses the outer surface 88 of the O-ring 74 and thereby establishes a substantial contact area and at the same time forces the O-ring against the seat 76 therefor so that a substantial frictional force is developed between the crank gear 54 and the O-ring 74 and in turn the O-ring 74 and the pulley fitting 70. With a predetermined force applied to the line guide 32 to resist its travel, i.e. a finger interrupting movement of the line guide 32, the crank gear 54 will slip on the O-ring 74 relative to the shaft 61 and/or the O-ring 74 will rotate in its seat 76 so as to stop travel of the line guide and thereby prevent injury to a user. The O-ring 74 provides a positive, friction generating surface for reliable operation under normal conditions. The O-ring 74 also can be simply and inexpensively replaced when it becomes worn or otherwise fails.

As an alternative to the use of an O-ring, a wheel 90 is shown on the shaft 61 in FIG. 3 in place of the pulley fitting 70. The wheel 90 is made from a high friction, resilient material and can be molded, press-fit or keyed onto the end of the shaft 61. The wheel 90 is generally disk-shaped with an outer, driven surface 92 that is engaged by the outer side surface 86 on the crank gear 54. The wheel 90 is sufficiently resilient that the teeth 94 on the crank gear 54 in effect dig into the outer surface 92 to effect a positive drive while retaining the slipping feature. With both embodiments, once the obstruction to movement of the line guide 32 is removed, the line guide 32 instantaneously resumes normal operation.

In FIGS. 4–7, four variations of pulleys 200, 300, 400 and 500, consecutively, are shown as well as the details for connection of the pulleys 200, 300, 400, 500 to the reduced end 72 of the shaft 61 on the worm gear 62.

The pulley 200 in FIG. 4 is molded in one piece from plastic and has a cylindrical body 202 with an integral, enlarged disk-shaped end 204 having thereon an annular arrangement of teeth 206 to mesh with teeth on the crank gear 54. A first bore 208, having a diameter greater than the diameter of the shaft end 72, extends partially through the body 202. A second, coaxial, reduced diameter bore 210 extends from the end of bore 208 through the remainder of the body 202 and the end 204 so that an axially inwardly facing annular shoulder 212 is defined.

A cylindrical rubber grommet 214 with a coaxial through bore 216 is press-fit into the body 202 through the bore 208 so that the leading surface 218 of the grommet 214 is presented facially against the shoulder 212. The diameter of the outer surface 220 of the grommet 214 is slightly greater than the diameter of the bore 208 so that the grommet is slightly compressed radially inwardly to permit its passage into the bore 208. The bore 216 in the assembled grommet 214 has a diameter that is slightly less than the diameter of the cylindrical shaft end 72. The worm gear 62 is assembled by pressing the shaft end 72 consecutively through the bore 208 in the body 202, the bore 216 in the grommet 214 and the bore 210 in the body 202 and end 204. The shaft end 72 is interference fit with the grommet 214 while being loosely accepted by the bores 208, 210. Entry into the grommet is facilitated by a bevel 222 on the leading end of the shaft end 72.

An annular undercut 224 is provided in the body 202 to accept a fastener such as a C-clip (not shown), or the like, to prevent axial shifting of the assembled pulley 200 relative to the reel casing.

With the structure in FIG. 4, the pulley 200 is held against rotation on the shaft end 72 by the grommet 214. The axial dimension of the grommet 214, the relative diameters of the bore 216 and the shaft end 72 and the relative diameters of the outer surface 220 of the grommet 202 and the bore 208 are chosen so that the pulley 200 can slip relative to the shaft end 72 under a predetermined force resisting rotation of the worm gear 62. This slippage can occur between the grommet 214 and the body 202 and/or the grommet 214 and shaft end 72, depending upon the relative dimensions of each.

Figure 5:
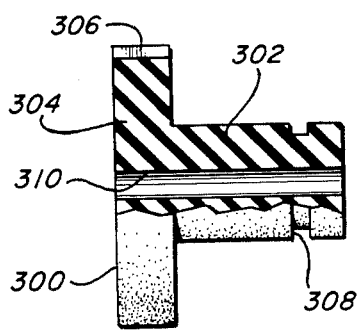
FIG. 5 is an elevation view of another modified form of pulley according to the invention and shown partially in section.
Figure 6:
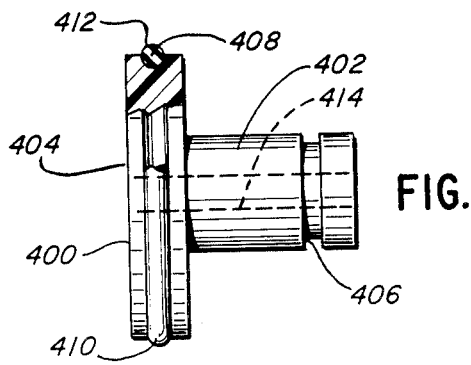
FIG. 6 is an elevation view of a further modified form of pulley according to the invention partially in section.

In FIG. 5, the pulley 300 is molded as a single piece from hard rubber. The pulley 300 has the same general cross-sectional configuration as the pulley 200 in FIG. 4. There is a cylindrical body 302 with an integral disk-shaped end 304 having an annular arrangement of gear teeth 306 to mesh with teeth on the crank gear 54. The body 302 has an undercut 308 to accept a retaining clip (not shown).

Rather than the stepped configuration of the bores in FIG. 4, the pulley 300 has a constant diameter through bore 310 with a diameter slightly less than the diameter of the shaft end 72. The pulley 300 is interference fit with the shaft end 72. The pulley body 302 and end 304 deform radially outwardly as the shaft end 72 is forced through the bore 310. Again, the diameter of the bore 310 is chosen so that the pulley 300 will positively transmit rotation from the crank gear 54 to the worm gear 62, but will also slip on the shaft end 72 under a predetermined resistance to rotation of the worm gear 62.

The pulley 400 is plastic molded and has an integral cylindrical body 402 and disk-shaped end 04. The body 402 has an undercut 406 for a retainer clip (not shown). The end 404 has a curved, annular, undercut seat 408 with a diameter generally corresponding to that of an O-ring 410, which surrounds the end 404 and resides in the seat 408. As with the embodiment in FIG. 2, the crank gear 54 engages and compresses the outermost surface 412 of the O-ring and thereby develops an enlarged drive surface on the O-ring 410. By compressing the O-ring 410 into the seat 408, the frictional force between the O-ring 410 and pulley end 404 is increased.

With a predetermined resistance to the rotation of pulley 400, as when a user's finger blocks the line guide 32, the crank gear 54 will slip relative to the O-ring 410 and/or the O-ring 410 will rotate in its seat 408 on the disk end 404. Because it is not necessary for the pulley body 402 to slip relative to the shaft end 72, in the FIG. 6 embodiment, the shaft end 72 is preferably keyed to the pulley 400. A through bore 414 is provided in the body 402 and end 404. With this configuration, the shaft end 72 may have a flat or be otherwise dimensioned so as to make keyed connection with a correspondingly shaped receiving bore 414.

Figure 7:
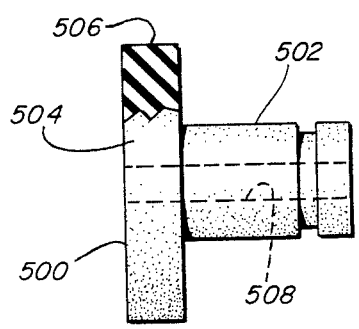
FIG. 7 is an elevation view of a still further modified form of pulley according to the invention partially in section.

In FIG. 7, the pulley 500 is made from solid hard rubber and has, as in the other embodiments, a cylindrical body 502 with an integral disk-shaped end 504. The end 504 has a smooth, annular, outer surface 506 which is engaged by the teeth on the crank gear 54. The relative dimensions of the crank gear 54 and pulley 500 are chosen so that the teeth on the crank gear 54 effectively dig into the outer surface 506 of the end 504 to effect driving thereof.

The pulley 500 has a through bore 508 which is slightly smaller in diameter than the shaft end 72 so that an interference fit is established upon the pulley 500 being pressed onto the shaft end 72. Under a predetermined resistance to rotation of the pulley 500, the pulley 500 slips relative to the shaft end 72 and/or the crank gear 54 slips relative to the driven outer surface 506 on the end 504.

I claim:

1. An improved bait cast reel of the type having a line-carrying spool, a rotatable crank handle with an associated crank shaft for rotating the spool so that the line is wound thereon, a line guide, and rotating means for moving the line guide in a reciprocative manner axially across the spool to distribute line evenly thereover as the spool is rotated, the improvement comprising:

a drive element with an annular drive surface;
    means mounting the drive element to the crank shaft so that the drive element follows rotation of the crank shaft;
    a pulley;
    means mounting the pulley to the means for moving the line guide to follow rotation thereof; and
    friction means on the pulley directly engaged by the annular drive surface for imparting rotation of the drive element to the pulley and for allowing relative rotation to occur between the drive element and the pulley with a predetermined force applied to said line guide tending to resist movement thereof,
    said friction means comprising a resilient O-ring that surrounds the pulley and is compressed between the pulley and the annular drive surface on the drive element,
    said annular drive surface having radially projecting circumferentially spaced teeth which tend to dig into the O-ring to both compress the O-ring against the pulley and key the drive element to the O-ring so that the line guide is positively driven by the drive element up to the point that said predetermined resistant force is applied to the line guide.

2. The improved bait cast reel according to claim 1 wherein said drive element comprises a crank gear on said crank shaft, said drive element mounting means comprises means for frictionally engaging the crank shaft and crank gear with an adjustable friction force and means are provided for transmitting rotation of the crank gear imparted by the crank shaft to the line-carrying spool, said crank gear serving the dual purpose of transmitting motion from the crank shaft both to the line-carrying spool and the line guide moving means.

3. The improved bait cast reel according to claim 1 wherein said O-ring has a curved surface extending radially outwardly from said pulley and the drive element directly engages and drives the curved outer O-ring surface.

* * * * *